US012643394B2

(12) United States Patent
Mammeri et al.

(10) Patent No.: US 12,643,394 B2
(45) Date of Patent: Jun. 2, 2026

(54) MODULAR PLATFORM OF A CHASSIS OF AN ELECTRIC MOTOR VEHICLE, COMPRISING A COOLING MODULE HAVING A TANGENTIAL TURBOMACHINE

(71) Applicant: VALEO SYSTEMES THERMIQUES, Le Mesnil-Saint-Denis (FR)

(72) Inventors: Amrid Mammeri, Le Mesnil-Saint-Denis (FR); Kamel Azzouz, Le Mesnil-Saint-Denis (FR); Sebastien Garnier, Le Mesnil-Saint-Denis (FR); Moussa Nacer Bey, Le Mesnil Saint-Denis (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 285 days.

(21) Appl. No.: 18/687,475

(22) PCT Filed: Aug. 23, 2022

(86) PCT No.: PCT/EP2022/073518
§ 371 (c)(1),
(2) Date: Feb. 28, 2024

(87) PCT Pub. No.: WO2023/030976
PCT Pub. Date: Mar. 9, 2023

(65) Prior Publication Data
US 2024/0351430 A1     Oct. 24, 2024

(30) Foreign Application Priority Data
Sep. 3, 2021 (FR) ...................................... 2109262

(51) Int. Cl.
B60K 11/08 (2006.01)
B60K 1/04 (2019.01)
(Continued)

(52) U.S. Cl.
CPC .............. B60K 11/085 (2013.01); B60K 1/04 (2013.01); H01M 10/613 (2015.04);
(Continued)

(58) Field of Classification Search
CPC ....... B60K 11/085; B60K 11/08; B60K 11/06; B60K 1/04; B60K 2001/0438;
(Continued)

(56) References Cited

U.S. PATENT DOCUMENTS

| | | | |
|---|---|---|---|
| 6,341,643 B1 * | 1/2002 | Osakabe | ................. F04D 17/04 |
| | | | 165/41 |
| 7,497,287 B2 * | 3/2009 | Kunikata | ............... B60K 11/04 |
| | | | 180/68.1 |

(Continued)

FOREIGN PATENT DOCUMENTS

| | | |
|---|---|---|
| EP | 3575118 A1 | 12/2019 |
| WO | 2021171213 A1 | 9/2021 |

OTHER PUBLICATIONS

Mihalascu Dan. "Israeli Startup's Next-Gen EV Platform Wants To Reinvent The Wheel Carscoops", May 21, 2020 (May 21, 2020), Retrieved from the Internet: https://www.carscoops.com/2020/05/israeli-startups-next-gen-ev-platform-wants-to-reinvent-the-wheel/ [retrieved on Apr. 21, 2022] XP 055914364 (7 pages).

(Continued)

*Primary Examiner* — John D Walters
(74) *Attorney, Agent, or Firm* — Osha Bergman Watanabe & Burton LLP

(57) ABSTRACT

A modular platform of an electric motor vehicle chassis is disclosed. The modular platform includes batteries and an electric powertrain of the electric motor vehicle. The modular platform also includes an upper and lower floor. Between the upper and lower floor is arranged at least one cooling module configured to have an external flow passing through (Continued)

it. The cooling module includes at least one heat exchanger configured to have the external flow passing through it and a first collector housing attached to the heat exchanger. The first collector housing forms a volute within which a tangential-flow turbomachine extends. The first collector housing includes a first open end facing the heat exchanger and a second open end at the end of its volute. The cooling module is arranged so the second open end of the cooling module faces one of the upper or lower floors.

7 Claims, 3 Drawing Sheets

(51) Int. Cl.
| | |
|---|---|
| *H01M 10/613* | (2014.01) |
| *H01M 10/625* | (2014.01) |
| *H01M 10/6561* | (2014.01) |
| *H01M 50/204* | (2021.01) |
| *H01M 50/249* | (2021.01) |

(52) U.S. Cl.
CPC ..... *H01M 10/625* (2015.04); *H01M 10/6561* (2015.04); *H01M 50/204* (2021.01); *H01M 50/249* (2021.01); *B60K 2001/0438* (2013.01); *H01M 2220/20* (2013.01)

(58) Field of Classification Search
CPC ............. H01M 10/613; H01M 10/625; H01M 10/6561; H01M 50/249; H01M 50/204
See application file for complete search history.

(56) References Cited

U.S. PATENT DOCUMENTS

| | | | |
|---|---|---|---|
| 10,919,575 B1 | 2/2021 | Sardes et al. | |
| 11,679,647 B2 * | 6/2023 | Hotta ................. | B60H 1/00328 |
| | | | 62/224 |
| 2005/0029027 A1 | 2/2005 | Kunikata et al. | |
| 2020/0406717 A1 | 12/2020 | Hotta | |

OTHER PUBLICATIONS

International Search Report in corresponding International Application No. PCT/EP2022/073518, dated Nov. 29, 2022 (7 pages).
Written Opinion in corresponding International Application No. PCT/EP2022/073518, dated Nov. 29, 2022 (6 pages).

* cited by examiner

MODULAR PLATFORM OF A CHASSIS OF AN ELECTRIC MOTOR VEHICLE, COMPRISING A COOLING MODULE HAVING A TANGENTIAL TURBOMACHINE

The present invention relates to the field of modular platforms of an electric motor vehicle chassis, and more particularly to cooling modules for such modular platforms. In the automotive field and particularly in the field of electric motor vehicles, for reasons of standardization and economies of scale, modular platforms of electric motor vehicle chassis are sometimes used. Such modular platforms include in particular the batteries, the electric powertrain, as well as parts not related to the motor, in particular the wheels, and the braking and suspension system of the motor vehicle. The electric powertrain of the motor vehicle refers more specifically to the power electronics together with the electric motor(s) of the motor vehicle. Such a modular platform is used in order to have a single platform containing most of the propulsion, power supply and electrical storage components, various passenger compartments and bodies, corresponding to different models of motor vehicles, then being fitted on this platform.

However, with a view to improving the range of the electric vehicle, a large part of the space within this modular platform is reserved for the batteries. There is then little space left for the integration of a thermal management device allowing thermal management of both the batteries and the passenger compartment. Conventional thermal management devices are generally bulky and require a lot of space for their integration into a motor vehicle. Thermal management devices generally comprise a cooling module comprising at least one heat exchanger intended to have an external air flow passing through it. This cooling module is one of the largest components of the thermal management device. It is therefore difficult to integrate cooling modules into such a modular platform in which the free space is reduced, while still having a surface area for heat exchange that allows efficient operation of the thermal management device.

One of the aims of the present invention is therefore to at least partially remedy the drawbacks of the prior art and to propose a modular platform with improved integration of a cooling module.

The present invention therefore relates to a modular platform of an electric motor vehicle chassis, said modular platform comprising the batteries as well as the electric powertrain of the electric motor vehicle, said modular platform comprising an upper floor and a lower floor between which is arranged at least one cooling module intended to have an external air flow passing through it, said cooling module comprising at least one heat exchanger, intended to have the external air flow passing through it, and a first collector housing attached to said heat exchanger, said first collector housing forming a volute within which a tangential-flow turbomachine extends, the first collector housing having a first open end facing the heat exchanger and a second open end at the end of its volute, the cooling module being arranged such that the second open end of said cooling module faces one or other of the upper or lower floors of the modular platform, said upper or lower floor comprising an opening facing the second open end of the cooling module.

According to one aspect of the invention, the second open end of the cooling module faces the lower floor of the modular platform, and said lower floor comprises an opening facing the second open end of the cooling module.

According to another aspect of the invention, the second open end of the cooling module is attached to the opening such that the edges of said second open end are in sealed contact with the edges of said opening.

According to another aspect of the invention, the opening comprises a protective grille.

According to another aspect of the invention, the opening comprises a shutter movable between an open position and a closed position of said opening.

According to another aspect of the invention, the shutter is a shutter controlled by an actuator.

According to another aspect of the invention, the shutter is a passive shutter comprising a device for returning it to the closed position.

Further features and advantages of the present invention will become more clearly apparent on reading the following description, which is provided by way of non-limiting illustration, and from the appended drawings, in which.

Figure 2A:
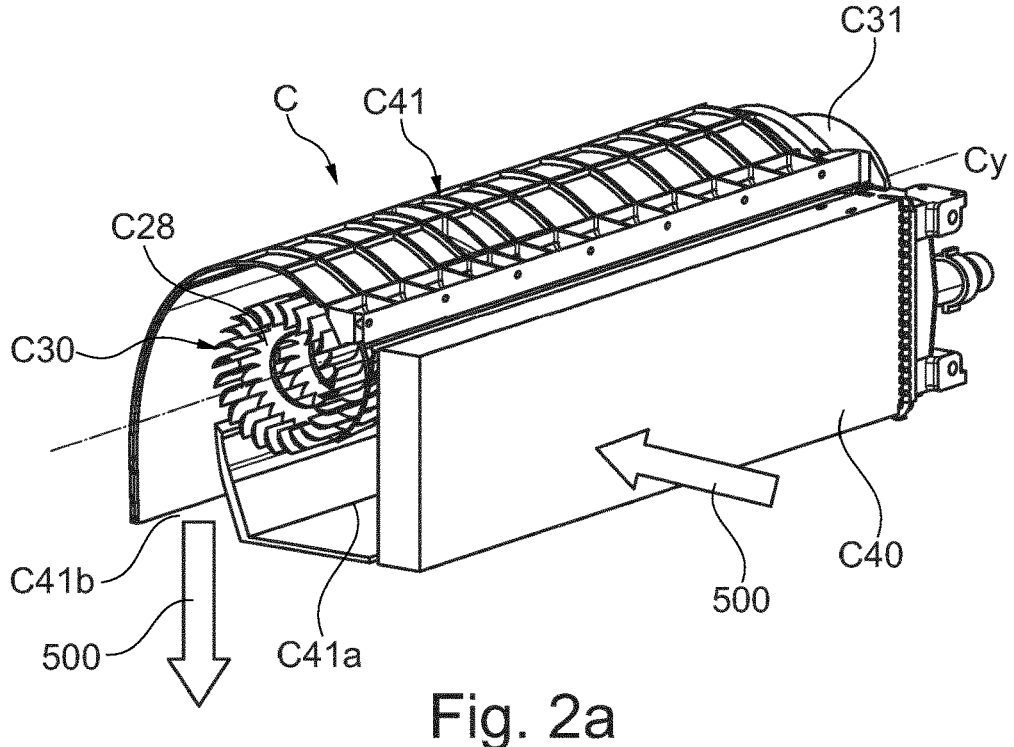
FIG. 2 is a schematic perspective view in cross section of a cooling module.
Figure 2B:
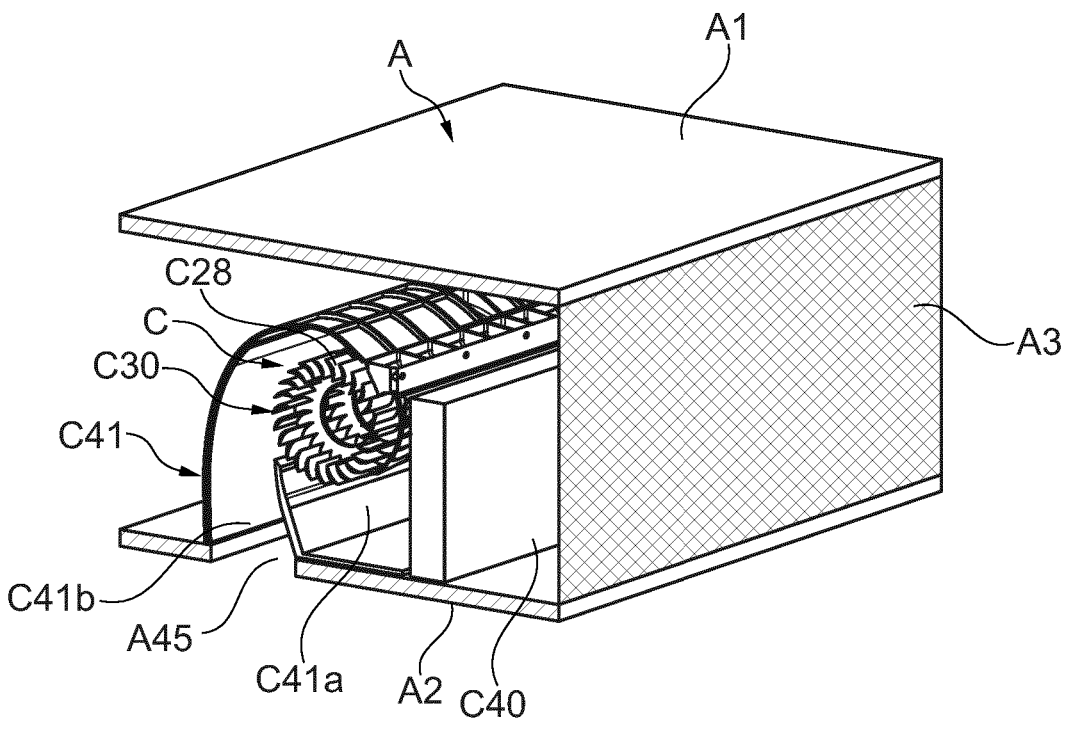
Figure 2C:
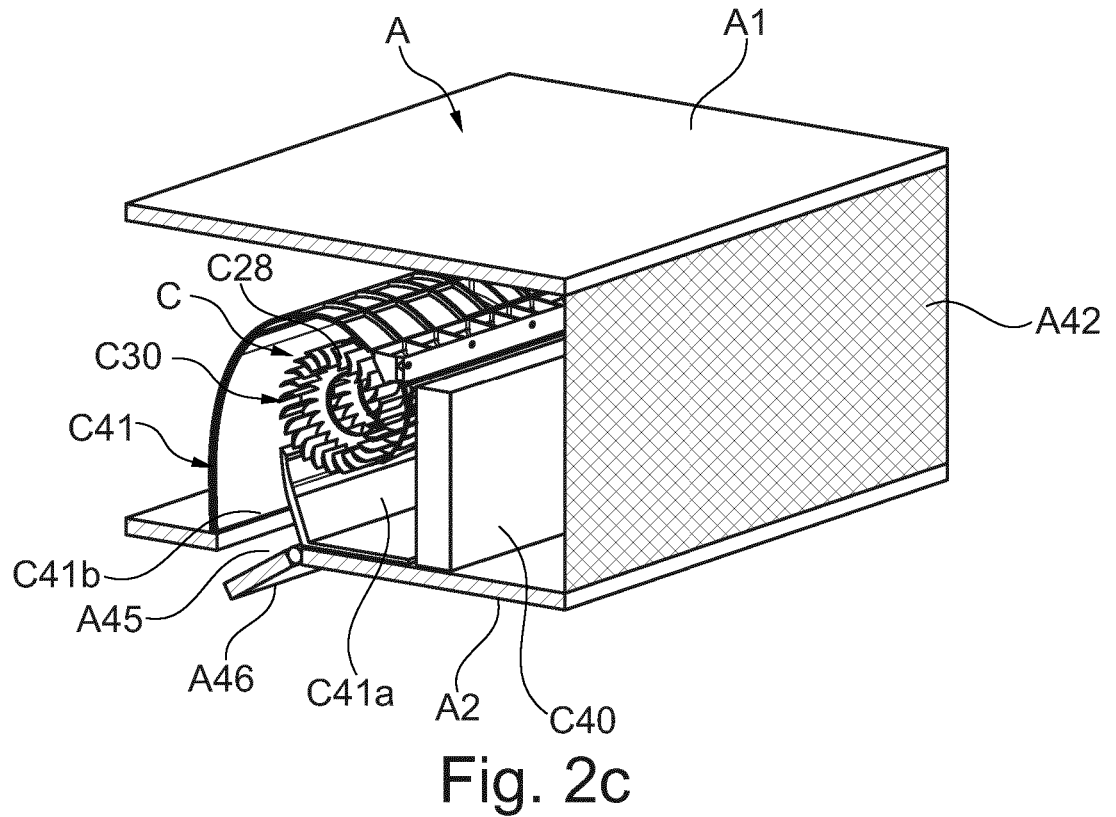
Figure 3:
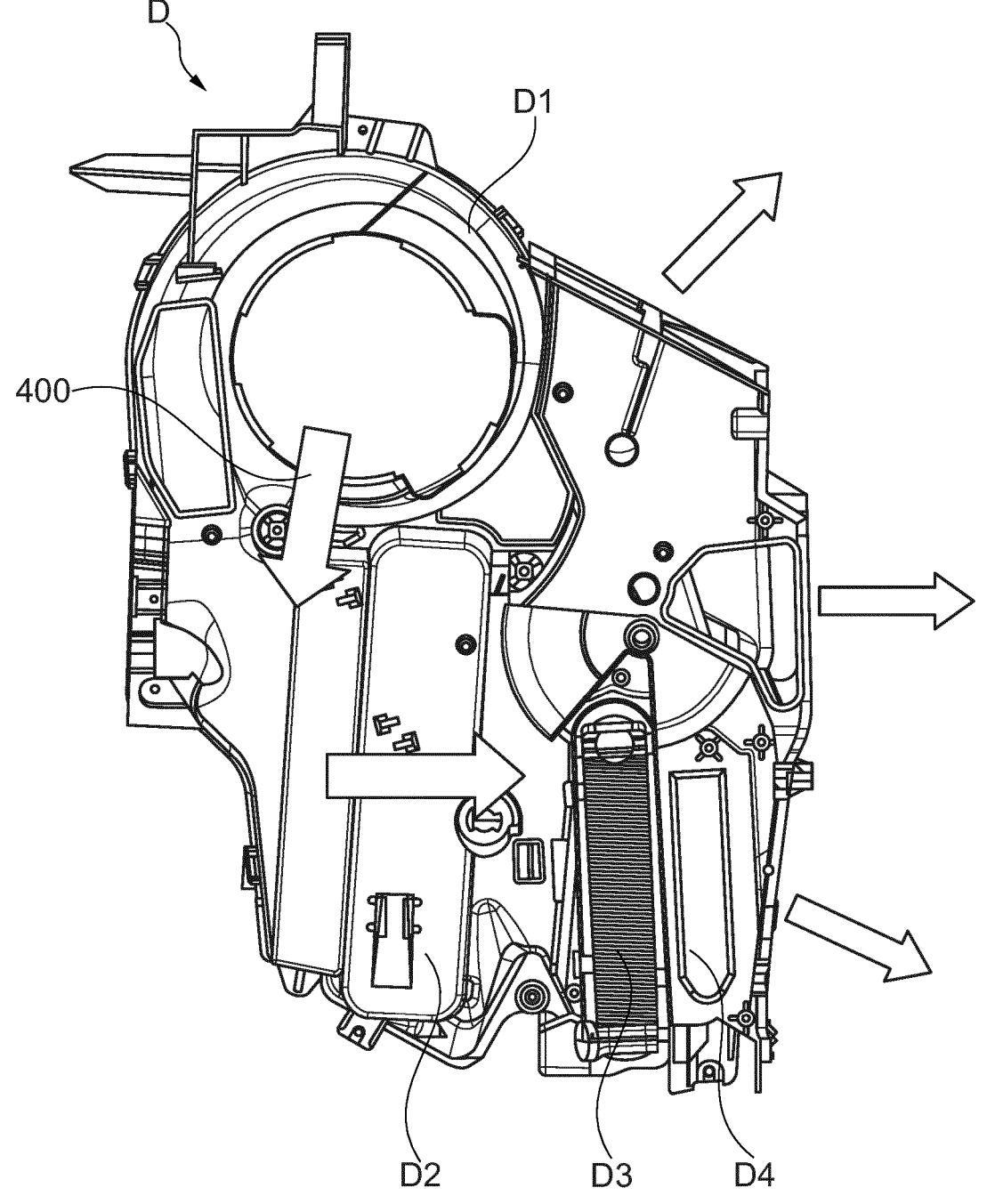

FIG. 2*b* is a schematic perspective view in cross section of a modular platform and its cooling module according to a first embodiment, FIG. 2*c* is a schematic perspective view in cross section of a modular platform and its cooling module according to a second embodiment, FIG. 3 is a schematic perspective view of a heating, ventilation and air-conditioning device.

In the various figures, identical elements bear the same reference numbers.

The following embodiments are examples. Although the description refers to one or more embodiments, this does not necessarily mean that each reference relates to the same embodiment, or that the features apply only to a single embodiment. Individual features of different embodiments may also be combined and/or interchanged to provide other embodiments.

In the present description, some elements or parameters may be given ordinal numbers such as, for example, first element or second element and first parameter and second parameter, or first criterion and second criterion, etc. In this case, the purpose of the ordinal numbering is simply to differentiate between and denote elements or parameters or criteria that are similar but not identical. This ordinal numbering does not imply that one element, parameter or criterion takes priority over another and such designations can easily be interchanged without departing from the scope of the present description. Likewise, this ordinal numbering does not imply any chronological order, for example in evaluating any given criterion.

In the present description, "placed upstream" is understood to mean that one element is placed before another with respect to the direction of circulation of a fluid. By contrast, "placed downstream" is understood to mean that one element is placed after another with respect to the direction of circulation of the fluid.

Figure 1:
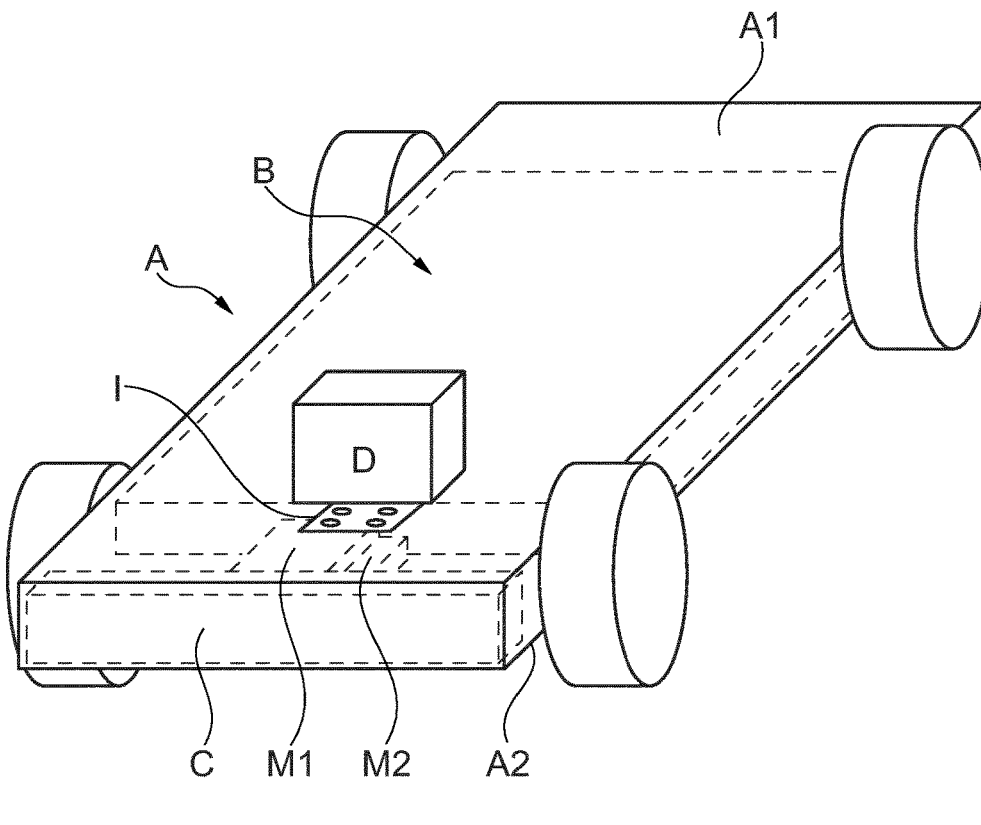
FIG. 1 is a semi-transparent schematic view of a modular platform.

FIG. 1 shows a modular platform A of an electric motor vehicle chassis. This modular platform A includes in particular the batteries B, the electric powertrain, as well as parts not related to the motor of the motor vehicle, in particular the wheels, and the braking and suspension system of the motor vehicle. The electric powertrain of the motor vehicle refers more specifically to the power electronics together with the electric motor(s) of the motor vehicle. Such a modular platform A is used in particular so as to have a platform on which various passenger compartments and bodies can be fitted.

In order to allow thermal management of the batteries B and of the passenger compartment, the modular platform A includes a thermal management device comprising one or more heat transfer fluid circuits (not shown). The thermal management device more particularly comprises various modules fluidically connected to one another in order to form the various heat transfer fluid circuits.

The thermal management device thus comprises a first module M1 and a second module M2 which comprise components such as heat exchangers, coolers, valves, pumps and compressors forming heat transfer fluid circulation circuits for thermal management. The thermal management device further comprises a cooling module C intended to have an external air flow 500 passing through it. The cooling module C comprises in particular at least one heat exchanger C40 also intended to have the external air flow 500 passing through it. This cooling module C is intended to be integrated within the modular platform A, preferably in the front part of the modular platform.

Such a cooling module C is shown in particular in FIG. 2a. The cooling module C may thus include a heat exchanger C40 and a first collector housing C41 attached to said heat exchanger C40. The first collector housing C41 preferably forms a volute with a first open end C41a positioned facing the heat exchanger C40 and a second open end C41b at the opposite end of the volute.

The cooling module C may also comprise at least one tangential fan, also known as a tangential-flow turbomachine C30, which is configured such as to generate the external air flow 500, for example when the motor vehicle is stopped or at a low speed. The tangential-flow turbomachine C30 comprises a rotor or turbine (or tangential blower-wheel) C28. The turbine C28 has a substantially cylindrical shape. The turbine C28 advantageously comprises a plurality of stages of blades (or vanes). The turbine C28 is mounted rotatably about an axis of rotation Cy, for example parallel to the plane formed by the heat exchanger C40, and extending across its width. The turbine C28 is more particularly arranged within the volute formed by the first collector housing. The tangential-flow turbomachine C30 is thus compact. The use of such a tangential-flow turbomachine C30 notably makes it possible for the external air flow 500 to be equal across the entire surface of the at least one heat exchanger C40. In addition, such a tangential-flow turbomachine C30 enables a space saving in comparison with conventional fans.

The tangential-flow turbomachine C30 may also comprise a motor C31 which is configured to rotate the turbine. The motor C31 is for example designed to drive the rotation of the turbine at a speed of between 200 rpm and 14000 rpm. This notably makes it possible to limit the noise generated by the tangential-flow turbomachine C30. In the example illustrated in FIG. 2a, the tangential-flow turbomachine C30 is configured to operate in suction, that is to say it sucks in the ambient air such that it passes through the heat exchanger C40 and is discharged through the second open end C41b of the volute. Alternatively, the tangential-flow turbomachine C30 may operate by discharge, that is to say blowing air from the second open end C41b of the volute toward the heat exchanger C40.

The cooling module C may also include a second collector housing (not shown) attached to the heat exchanger C40 on its face opposite that comprising the first collector housing C41. This second collector housing may include an opening to allow the external air flow 500 to pass through.

This opening may have a shut-off device (not shown) that is able to move between a first position, referred to as the open position, and a second position, referred to as the shut-off position. This shut-off device is in particular configured to allow the external air flow 500 to pass through said opening in its open position and to shut off said opening in its shut-off position. The shut-off device may take various forms, such as, for example, the form of a plurality of shutters mounted so as to pivot between an open position and a closed position. These shutters are preferably mounted parallel to the width of the cooling module C. However, it is entirely possible to imagine other configurations such as, for example, shutters mounted parallel to the height of the cooling module. The shutters can be shutters of the flag type, but other types of shutters such as butterfly shutters can perfectly well be envisaged.

As shown in FIGS. 2b and 2c, the modular platform A may in particular comprise an upper floor A1 and a lower floor A2 between which the cooling module C is notably arranged. Upper floor A1 in this case means a floor oriented upward, on which a body and a passenger compartment are intended to be fitted in particular. The lower floor A2 for its part forms the base of the modular platform A and is facing the ground. The modular platform A may also include a grille A42 or air openings A42, connecting the two floors A1, A2, facing the cooling module C.

The cooling module C is more particularly arranged between the upper floor A1 and the lower floor A2 such that the second open end C41b of the cooling module C faces one or other of the upper A1 or lower A2 floors. The upper A1 or lower A2 floor facing the second open end C41b for its part comprises an opening A45 facing said second open end C41b of the cooling module C. Thus, the external air flow 500 may circulate directly between the second open end C41b and the opening A45 either in one direction or the other depending on whether the tangential-flow turbomachine C30 is operating in suction or discharge. This makes it possible to isolate the external air flow 500 from the other components of the thermal management device present within the modular platform A, between the upper A1 and lower A2 floors.

As in the examples illustrated in FIGS. 2b and 2c, the cooling module C is preferably arranged such that the second open end C41b of the cooling module C faces the lower floor A2 of the modular platform A. It is thus the lower floor A2 that comprises the opening A45 facing the second open end C41b. In suction, the external air flow 500 is thus discharged through the second open end C41b of the cooling module C under the modular platform A.

In order to reinforce the isolation of the external air flow 500 from the rest of the components installed between the upper A1 and lower A2 floors, the second open end C41b of the cooling module C is preferably attached to the opening A45 such that the edges of said second open end C41b are in sealed contact with the edges of said opening A45.

Advantageously, the opening A45 may include a protective grille (not shown) in order to limit the possibility of debris or projectiles entering via the opening A45. As shown in FIG. 2c, the opening A45 may comprise a shutter A46 movable between an open position and a closed position of said opening A45. This shutter A46 may for example be a flag or butterfly shutter. The shutter A46 may be a shutter controlled by an actuator (not shown) in order to move from one position to another as required. The shutter A46 may also be a passive shutter comprising a return device (not shown), for example a spring, which brings the shutter A46 into the closed position by default. When the external air flow 500 is sufficiently powerful, it may counteract the force of the return device and bring the shutter A46 into its open position. When the external air flow 500 is absent or not powerful enough, the shutter A46 is passively returned to the closed position.

The thermal management device also includes a heating, ventilation and air-conditioning device D intended to have passing through it an internal air flow 400 destined for a passenger compartment. Such a heating, ventilation and air-conditioning device D is shown in FIG. 3. The heating, ventilation and air-conditioning device D comprises in particular, within a housing, a cooler D2, intended to cool the internal air flow 400, a second heat exchanger D3, intended to heat the internal air flow 400, and a ventilation means D1 configured to generate the internal air flow 400. The cooler D2 and the heat exchanger D3 are intended in particular to be connected to the heat transfer fluid circuits of the thermal management device. The heating, ventilation and air-conditioning device D may also include an electric heater D4 intended to additionally heat the internal air flow 400.

The heating, ventilation and air-conditioning device D may in particular be arranged outside the modular platform A, for example within a passenger compartment fitted on said modular platform A. In this case, the thermal management device comprises a connection interface I (see FIG. 1) intended to allow the fluidic connection of the heating, ventilation and air-conditioning device D to heat transfer fluid circuits and to the elements of the thermal management device arranged within the modular platform A.

The thermal management device lastly includes an interface for heat exchange BAT with the batteries B. The heat exchange interface BAT is notably arranged within the modular platform A and connected to the heat transfer fluid circuits of the thermal management device.

The various modules M1, M2, the cooling module C, the heating, ventilation and air-conditioning device D and the interface for heat exchange BAT with the batteries B are connected to one another in such a way as to form the various heat transfer fluid circuits. The use of a first module M1, a second module M2 as well as a cooling module C and a heating, ventilation and air-conditioning device D makes it possible to have a compact thermal management device that may be easily integrated within the modular platform A. It is thus clear that the arrangement and positioning of several cooling modules C, C', C" makes it possible to obtain a sufficient surface area for heat exchange, while limiting the space taken up within the modular platform A.

6

The invention claimed is:

1. A modular platform of an electric motor vehicle chassis, the modular platform comprising one or more batteries and an electric powertrain of the electric motor vehicle, the modular platform further comprising an upper floor and a lower floor, wherein between the upper and lower floor is arranged at least one cooling module configured to have an external air flow passing through it, the cooling module comprising at least one heat exchanger, configured to have the external air flow passing through it, and a first collector housing attached to the heat exchanger, wherein the first collector housing forms a volute within which a tangential-flow turbomachine extends, the first collector housing comprising a first open end facing the heat exchanger and a second open end at the end of its volute, wherein the cooling module is arranged such that the second open end of the cooling module faces one or other of the upper or lower floors of the modular platform, and wherein the upper or lower floor comprises an opening facing the second open end of the cooling module.

2. The modular platform as claimed in claim 1, wherein the second open end of the cooling module faces the lower floor of the modular platform, and wherein the lower floor comprises an opening facing the second open end of the cooling module.

3. The modular platform as claimed in claim 1, wherein the second open end of the cooling module is attached to the opening such that the edges of the second open end are in sealed contact with the edges of the opening.

4. The modular platform as claimed in claim 1, wherein the opening comprises a protective grille.

5. The modular platform as claimed in claim 1, wherein the opening comprises a shutter movable between an open position and a closed position of the opening.

6. The modular platform as claimed in claim 5, wherein the shutter is a shutter controlled by an actuator.

7. The modular platform as claimed in claim 5, wherein the shutter is a passive shutter comprising a device for returning it to the closed position.

* * * * *